(12) United States Patent
Matsubara et al.

(10) Patent No.: US 9,873,375 B2
(45) Date of Patent: Jan. 23, 2018

(54) VEHICLE APPROACH ALERT DEVICE

(71) Applicant: ANDEN CO., LTD., Anjo, Aichi-pref. (JP)

(72) Inventors: Yukiko Matsubara, Anjo (JP); Hironari Tajimi, Anjo (JP); Chikara Yamamoto, Anjo (JP); Hiroshi Sakakibara, Anjo (JP); Osamu Tateyama, Anjo (JP)

(73) Assignee: ANDEN CO., LTD., Anjo, Aichi-pref. (JP)

( * ) Notice: Subject to any disclaimer, the term of this patent is extended or adjusted under 35 U.S.C. 154(b) by 0 days.

(21) Appl. No.: 15/242,656

(22) Filed: Aug. 22, 2016

(65) Prior Publication Data

US 2017/0096099 A1    Apr. 6, 2017

(30) Foreign Application Priority Data

Oct. 5, 2015    (JP) .................................. 2015-197876

(51) Int. Cl.
*B60Q 1/00*     (2006.01)
*B60Q 5/00*     (2006.01)
*G10K 11/178*   (2006.01)

(52) U.S. Cl.
CPC ............ *B60Q 5/008* (2013.01); *G10K 11/178* (2013.01); *G10K 2210/1282* (2013.01)

(58) Field of Classification Search
CPC ................ B60Q 5/008; G10K 11/178; G10K 2210/1282
USPC ... 340/425.5, 10.33, 10.34, 933, 459, 384.3; 381/61, 71.4, 86
See application file for complete search history.

(56) References Cited

U.S. PATENT DOCUMENTS

| 2009/0066499 | A1* | 3/2009 | Bai | G10K 15/04 340/459 |
| 2011/0010269 | A1* | 1/2011 | Ballard | B60Q 5/008 705/26.41 |
| 2011/0175718 | A1* | 7/2011 | Inoue | B60Q 5/008 340/463 |
| 2011/0313617 | A1* | 12/2011 | Omote | B60Q 5/008 701/36 |

(Continued)

FOREIGN PATENT DOCUMENTS

| JP | H05-208636 A | 8/1993 |
| JP | 2011-148401 A | 8/2011 |

*Primary Examiner* — Dhaval Patel
(74) *Attorney, Agent, or Firm* — Harness, Dickey & Pierce, P.L.C.

(57) ABSTRACT

A vehicle approach alert device includes: a memory memorizing a warning sound source data for emitting a warning sound from an external sound emitting unit and a canceling sound source data for emitting a canceling sound from an internal sound emitting unit. The canceling sound cancels the warning sound transmitted from the external sound emitting unit to inside of the vehicle. The vehicle approach alert device further includes: a control part configured to read the warning sound source data from the memory to cause the external sound emitting unit to emit the warning sound based on the warning sound source data, and to read the canceling sound source data from the memory to cause the internal sound emitting unit to emit the canceling sound based on the canceling sound source data to be synchronized with the warning sound.

17 Claims, 7 Drawing Sheets

(56) References Cited

U.S. PATENT DOCUMENTS

2015/0092957 A1* 4/2015 Osawa .................. G10K 15/02
381/86

* cited by examiner

VEHICLE APPROACH ALERT DEVICE

CROSS REFERENCE TO RELATED APPLICATION

This application is based on Japanese Patent Application No. 2015-197876 filed on Oct. 5, 2015, the disclosure of which is incorporated herein by reference in its entirety.

TECHNICAL FIELD

The present disclosure relates to a vehicle approach alert device.

BACKGROUND

When an electric vehicle equipped only with an electric motor as a drive source travels at low speed, the travelling sound emitted from the electric vehicle is very small. When a hybrid vehicle equipped with an electric motor and an internal-combustion engine as drive source travels at low speed, the travelling sound emitted from the hybrid vehicle is very small because only the electric motor is driven at the low-speed travelling. For this reason, a pedestrian may not notice the vehicle approaching.

A vehicle approach alert device is proposed for such low noise vehicle, by which a pedestrian outside the vehicle can notice the presence of vehicle due to a warning sound which notifies the approach of vehicle.

JP 5026536 B (corresponding to US 2011/0175718 A1) describes an equipment generating a beep sound from a speaker outside a vehicle in response to a standard signal in sync with rotation of a drive motor. Further, an output sound of a speaker inside the vehicle is controlled through an amplifier such that a microphone located at a position where the sound is to be reduced inside the vehicle receives the minimum input.

JP 3257012 B describes an equipment generating a beep sound from a speaker outside a vehicle. Further, a canceling sound is generated inside the vehicle to cancel the beep sound transmitted to the inside from the outside of the vehicle. The canceling sound is output from a speaker inside the vehicle.

However, in JP 5026536 B and JP 3257012 B, it is necessary for a control part to execute real time calculation based on the input from a microphone every time in consideration of a signal for outputting a beep sound to cancel the warning sound. For this reason, the control part needs to perform complicated processing, and the processing load of the control part is large.

SUMMARY

It is an object of the present disclosure to provide a vehicle approach alert device in which a processing load of a control part is reduced, while the warning sound transmitted to the inside of the vehicle is reduced.

According to an aspect of the present disclosure, a vehicle approach alert device warns an approach of a vehicle by emitting a warning sound from an external sound emitting unit toward an outside of the vehicle, and includes: an internal sound emitting unit emitting sound toward an inside of the vehicle; a memory memorizing a warning sound source data for emitting the warning sound and a canceling sound source data for emitting a canceling sound that cancels the warning sound transmitted from the external sound emitting unit to an inside of the vehicle; and a control part. The control part reads the warning sound source data from the memory to cause the external sound emitting unit to emit the warning sound based on the warning sound source data, and reads the canceling sound source data from the memory to cause the internal sound emitting unit to emit the canceling sound based on the canceling sound source data to be synchronized with the warning sound.

Accordingly, the control part reads the warning sound source data from the memory and makes the warning sound output from the external sound emitting unit based on the warning sound source data, and reads the canceling sound source data from the memory to output the canceling sound from the internal sound emitting unit to be synchronized with the warning sound based on the canceling sound source data. Therefore, it is not necessary to real-time calculate and generate the signal for canceling the warning sound based on the input from a microphone. The warning sound transmitted to the vehicle interior can be reduced while the processing load of the control part is reduced.

The vehicle approach alert device may further include an operation part that controls at least one of a phase difference and a sound pressure difference between the warning sound emitted from the external sound emitting unit and the canceling sound emitted from the internal sound emitting unit. The control part may control at least one of the phase difference and the sound pressure difference between the warning sound emitted from the external sound emitting unit and the canceling sound emitted from the internal sound emitting unit according to an operation of the operation part.

Accordingly, at least one of the phase difference and the sound pressure difference between the warning sound output from the external sound emitting unit and the canceling sound output from the internal sound emitting unit can be controlled according to the operation of the operation part. An occupant in the vehicle can operate the operation part suitably to adjust at least one of the phase difference and the sound pressure difference.

The canceling sound source data includes no high frequency component higher than or equal to 2 kHz. For example, the high frequency component can be removed using a low pass filter with a cutoff frequency lower than 2 kHz.

Since attenuation of the high frequency component is large in the warning sound transmitted from the external sound emitting unit to the vehicle interior, it is possible to fully cancel the warning sound transmitted to the vehicle interior while the high frequency component is removed in this way. Thereby, the effect of reducing the power consumption is acquired since it becomes unnecessary to output the high frequency component of the canceling sound.

The control part may control a sound pressure of the canceling sound emitted from the internal sound emitting unit to be smaller than that of the warning sound emitted from the external sound emitting unit.

Since attenuation is large in the warning sound transmitted from the external sound emitting unit to the vehicle interior, as described above, it is possible to fully cancel the warning sound even if the sound pressure of the canceling sound output from the internal sound emitting unit is smaller than the warning sound output from the external sound emitting unit. Moreover, since the sound pressure of the canceling sound output from the internal sound emitting unit can be made small, power consumption can also be reduced.

The memory is a single memory memorizing the canceling sound source data and the warning sound source data.

Thus, the cost can be reduced by memorizing both the canceling sound source data and the warning sound source data in one memory, as compared with a case where a canceling sound source data and a warning sound source data are memorized separately in two or more memories.

The vehicle approach alert device may further include a connector terminal connected to an acoustic sound emitting unit disposed inside of the vehicle. The control part outputs a signal for outputting the canceling sound to the connector terminal.

Accordingly, since the control part outputs the signal for outputting the canceling sound to the connector terminal that is connected to the acoustic sound emitting unit, it is not necessary to provide an internal sound emitting unit for exclusive use outputting the canceling sound. Thus, the cost can be reduced.

The internal sound emitting unit may be arranged at least one of a seat back on which an occupant of the vehicle is seated and a headrest defined on the seat back.

Thus, the internal sound emitting unit is located near the occupant's ear. It is possible to use a small inexpensive speaker to emit the canceling sound with the minimum sound pressure to cancel the warning sound.

The vehicle approach alert device may further include a seat sensor that detects an occupant on a seat of the vehicle. The control part stops the canceling sound from being emitted from the internal sound emitting unit that is placed on the seat on which the occupant is not detected by the seat sensor.

Thus, the control part stops the canceling sound from the internal sound emitting unit on the seat on which no occupant is seated, not to consume useless electric power.

The vehicle approach alert device may further include a speed determining part which determines whether a speed of the vehicle is higher than or equal to a predetermined value. The control part stops the canceling sound when the speed determining part determines that the speed of the vehicle is higher than or equal to the predetermined value.

When the speed of vehicle is higher than or equal to the predetermined value, the travelling sound of the vehicle becomes large, and a big effect cannot be acquired by emitting the canceling sound from the internal sound emitting unit. For this reason, as described above, the canceling sound is stopped not to consume useless electric power when it is determined that the speed of vehicle is beyond the predetermined value by the speed determining part.

The vehicle approach alert device may further include a rain determining part which determines whether it is raining outside the vehicle. The control part stops the canceling sound when the rain determining part determines that it is raining outside the vehicle.

If it is raining outside of the vehicle, the canceling sound emitted from the internal sound emitting unit may be masked by the sound of raining. For this reason, as described above, the canceling sound is stopped not to consume useless electric power when it is determined that it is raining outside of the vehicle by the rain determining part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
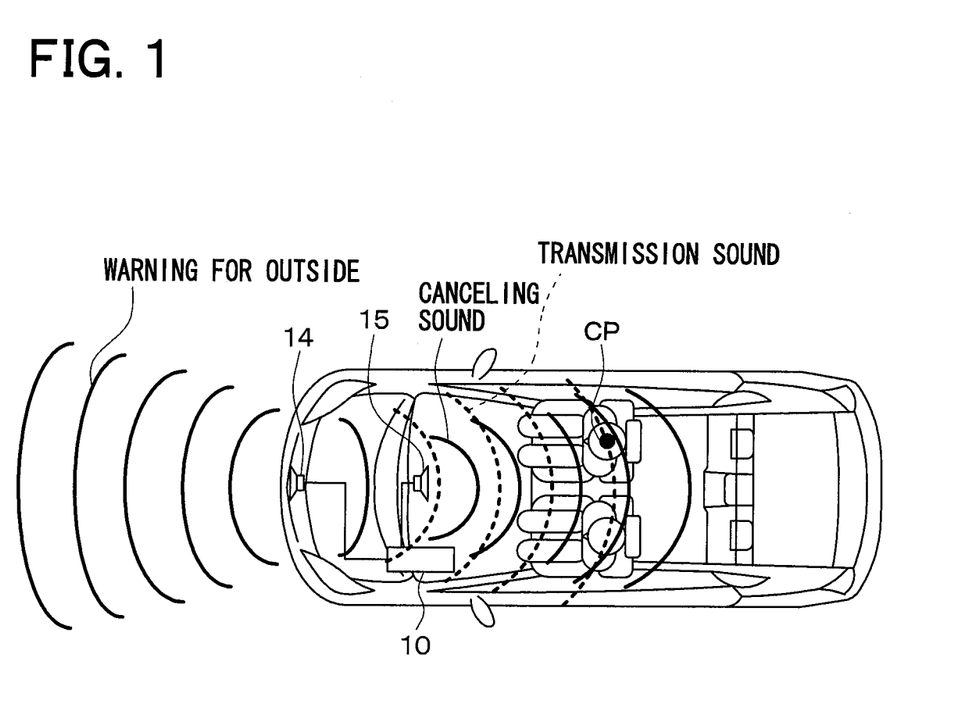
FIG. 1 is a view showing a vehicle including a vehicle approach alert device according to a first embodiment.

A vehicle including a vehicle approach alert device according to a first embodiment is shown in FIG. 1. The vehicle approach alert device is mounted in a hybrid vehicle which runs using an engine and a motor as drive source, and is equipped with an approach alert ECU 10, an external speaker 14, and an internal speaker 15. The vehicle approach alert system produces a warning sound from the external speaker 14 towards outside of the vehicle, to notify an approach of the vehicle.

The external speaker 14 is an external sound emitting unit installed in the engine compartment of the vehicle, and generates warning sound towards the outside of the vehicle. The vehicle approach alert device has the internal speaker 15 that emits sound for inside of the vehicle. The internal speaker 15 is fixed to an instrumental panel of the vehicle. The internal speaker 15 is an internal sound emitting unit.

The vehicle approach alert device produces a canceling sound from the internal speaker 15 to cancel a transmission sound of the warning sound transmitted from the external speaker 14 outside of the vehicle to the inside of the vehicle. A canceling point CP is defined at a driver's head adjacent to the driver's ear. The vehicle approach alert device of this embodiment produces the canceling sound from the internal speaker 15 such that the transmission sound is cancelled at the canceling point CP.

Figure 2:
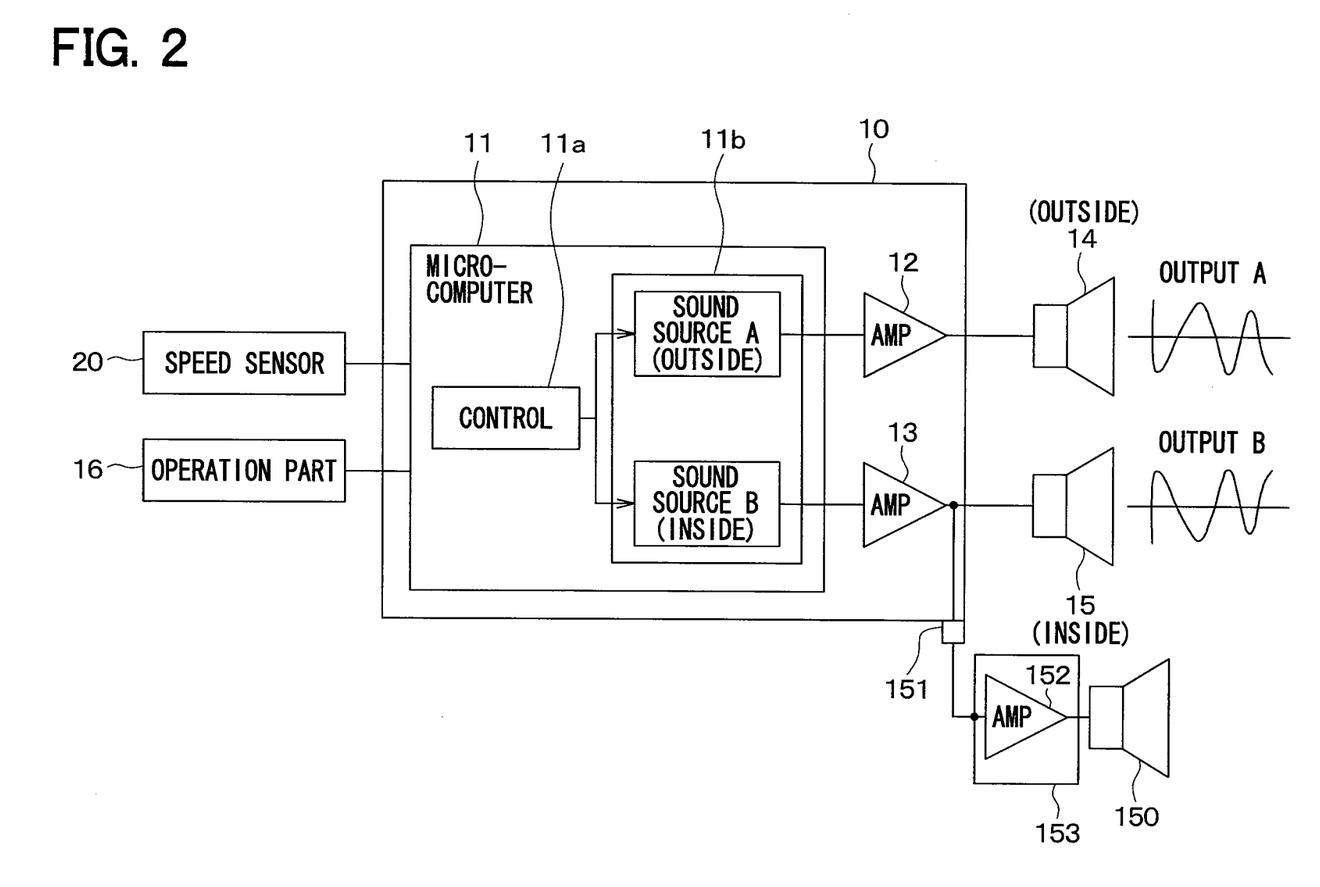
FIG. 2 is a block diagram of the vehicle approach alert device of the first embodiment.

The block diagram of the vehicle approach alert device of the first embodiment is shown in FIG. 2. The vehicle approach alert device includes the approach alert ECU 10, the external speaker 14, the internal speaker 15, and an operation part 16. A speed sensor 20 which outputs a speed signal of the vehicle is connected to the approach alert ECU 10.

The approach alert ECU 10 has a microcomputer 11 and amplifiers (AMP) 12, 13.

The microcomputer 11 has a calculation part (not shown), a control part 11a, and a memory 11b. Various programs are memorized in the memory 11b. The calculation part of the microcomputer 11 carries out various calculations and processing according to the program memorized by the memory 11b.

The memory 11b memorizes a control program for emitting sound, a first sound source A for emitting the warning sound outside of the vehicle, a second sound source B for emitting the canceling sound inside of the vehicle. The first sound source A corresponds to a warning sound source data to produce the warning sound from the external speaker 14, and the second sound source B corresponds to a canceling sound source data to produce the canceling sound from the internal speaker 15.

Each of the first sound source A and the second sound source B is a pulse code modulation (PCM) sound source data in which the signal of frequency component is sampled and quantized, and the magnitude of the acquired signal is digitalized as data. Moreover, the first sound source A and the second sound source B have the same time length (for example, 2 seconds) as the PCM sound source data.

The control part 11a of the microcomputer 11 outputs an audio signal based on the first sound source A memorized by the memory 11b to the amplifier 12, and outputs an audio signal based on the second sound source B memorized by the memory 11b to the amplifier 13, according to the control program memorized by the memory 11b.

Specifically, the first sound source A is read from the memory 11b, and the audio signal according to the first sound source A is outputted to the amplifier 12. Furthermore, the second sound source B is read from the memory 11b, and the audio signal according to the second sound source B is outputted to the amplifier 13. Sound is continuously emitted from the external speaker 14 and the internal speaker 15 by repeating such processing.

The operation part 16 has a phase difference adjustment switch (not shown) and a sound pressure difference adjustment switch (not shown). The phase difference adjustment switch adjusts the phase difference between the warning sound output from the external speaker 14 and the canceling sound output from the internal speaker 15. The sound pressure difference adjustment switch adjusts the sound pressure difference between the warning sound output from the external speaker 14 and the canceling sound output from the internal speaker 15.

The operation part 16 outputs a signal according to the operation to the sound pressure difference adjustment switch to the microcomputer 11, and outputs a signal according to the operation to the phase difference adjustment switch to the microcomputer 11.

The microcomputer 11 controls the phase difference between the warning sound output from the external speaker 14 and the canceling sound output from the internal speaker 15 according to the signal in response to the operation to the phase difference adjustment switch of the operation part 16.

The microcomputer 11 controls the sound pressure difference between the warning sound output from the external speaker 14 and the canceling sound output from the internal speaker 15 according to the signal in response to the operation to the sound pressure difference adjustment switch of the operation part 16.

Thus, an occupant of the vehicle is able to control the phase difference and the sound pressure difference between the warning sound output from the external speaker 14 and the canceling sound output from the internal speaker 15 by operating the sound pressure difference adjustment switch and the sound pressure difference adjustment switch of the operation part 16.

Next, generation of the second sound source B memorized by the memory 11b is explained. First, the warning sound output from the external speaker 14 is recorded at the canceling point CP. It is possible to cancel the warning sound at the canceling point CP by generating the canceling sound with a phase opposite to the phase of the sound recorded at the canceling point CP.

However, the canceling effect at the canceling point CP will decrease if the transfer characteristic between the internal speaker 15 and the canceling point CP is not taken into consideration, in the case where the internal speaker 15 and the canceling point CP are far from each other. For this reason, in this embodiment, the second sound source B is generated according to the following procedures.

First, a microphone is arranged at the canceling point CP, and records the warning sound gathered by the microphone after the warning sound is output from the external speaker 14. Furthermore, a high frequency component (for example, 2 kHz or more) is removed from the recorded sound because the canceling effect is small for the high frequency component. Specifically, a high frequency component is removed using a low pass filter with a cutoff frequency lower than 2 kHz.

Since attenuation of high frequency component is large in the warning sound transmitted from the external speaker 14 to the vehicle interior, a high frequency component is removed in this way from the second sound source B for generating the canceling sound. Thereby, the power consumption can be reduced since it becomes unnecessary to output the high frequency component of the canceling sound.

Next, a white noise source that generates white noise is prepared, and white noise is generated from the internal speaker 15. The microphone arranged at the canceling point CP gathers sound, and the transfer characteristic between the internal speaker 15 and the microphone is calculated. Furthermore, the reverse transfer characteristic (filter property) between the internal speaker 15 and the microphone is calculated from the transfer characteristic between the internal speaker 15 and the microphone. Since a method of calculating the transfer characteristic and the reverse transfer characteristic between the internal speaker 15 and the microphone is well known (for example refer to JP 3257012 B), the explanation about the details is omitted here.

Next, the second sound source B that is a sound source of the canceling sound is generated by performing a filter processing with the reverse transfer characteristic (filter property) relative to the warning sound from which the high frequency component is removed. In addition, the canceling sound produced based on the second sound source B has a phase opposite from that of the warning sound produced based on the first sound source A. Thus, the second sound source B is memorized in the same one memory 11b as the first sound source A.

Figure 3:
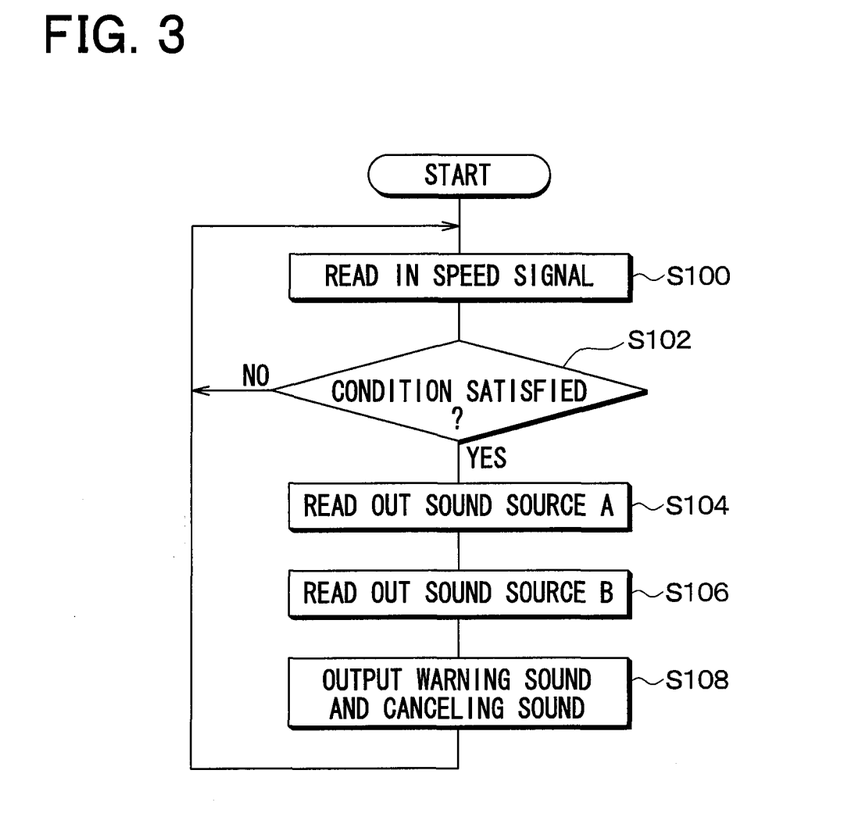
FIG. 3 is a flow chart executed by a microcomputer of the vehicle approach alert device of the first embodiment.

FIG. 3 is a flow chart executed by the microcomputer 11 of this embodiment. The processing executed by the control part 11a of the microcomputer 11 is included in the processing executed by the microcomputer 11, while explaining the flow chart. When the ignition switch of the vehicle is turned ON, the vehicle approach alert device is in the operating state, and the microcomputer 11 starts the processing shown in FIG. 3. Each control step in the flow chart corresponds to function realization means of the microcomputer 11.

First, a speed signal of the vehicle is read (S100). Specifically, the speed signal outputted from the speed sensor 20 is read.

Next, it is determined whether a condition is satisfied (S102). When the vehicle speed is less than 20 km/h and when the vehicle is travelling only by the motor in the state where the engine is not working, it is determined that the condition is satisfied in the vehicle approach alert device.

When it is determined that the condition is satisfied at S102, the first sound source A is read (S104) for outputting the warning sound outside the vehicle. Specifically, the first sound source A is read from the memory 11b. The audio signal according to the first sound source A is outputted to the amplifier 12.

Next, the second sound source B is read for outputting the canceling sound (S106). Specifically, the second sound source B is read from the memory 11b.

Next, the warning sound and the canceling sound are outputted (S108). Specifically, the audio signal based on the first sound source A is output to the amplifier 12, and the audio signal based on the second sound source B is output to the amplifier 13 to synchronize with the audio signal based on the first sound source A. The amplifier 12 amplifies an incoming signal and outputs the amplified signal to the external speaker 14, and the amplifier 13 amplifies an incoming signal and outputs the amplified signal to the internal speaker 15, then returns to S100. Thus, the canceling sound based on the second sound source B is reproduced to synchronize with the warning sound based on the first sound source A. Moreover, the sound pressure of the canceling sound outputted from the internal speaker 15 is smaller than the sound pressure of the warning sound outputted from the external speaker 14.

Although not shown in FIG. 3, the microcomputer 11 controls the phase difference between the warning sound output from the external speaker 14 and the canceling sound output from the internal speaker 15 according to the signal in response to the operation to the phase difference adjustment switch of the operation part 16.

The microcomputer 11 controls the sound pressure difference between the warning sound output from the external speaker 14 and the canceling sound output from the internal speaker 15 according to the signal in response to the operation to the sound pressure difference adjustment switch of the operation part 16.

As described above, the memory 11b memorizes beforehand the finite data of the warning sound source for outputting the warning sound and the finite data of the canceling sound source for outputting the canceling sound that cancels the warning sound transmitted to the vehicle interior from the external speaker 14. The microcomputer 11 reads the finite data of the warning sound source from the memory 11b and makes the external speaker 14 to emit the warning sound based on the data, and reads the finite data of the canceling sound source from the memory 11b and makes the internal speaker 15 to output the canceling sound based on the data to be synchronized with the warning sound. For this reason, it is not necessary to perform real-time calculation and to generate a signal for canceling the warning sound each time based on the input from a microphone. The warning sound transmitted to the vehicle interior can be reduced while the processing load of the microcomputer 11 is reduced.

In a comparison example where sound output from an internal speaker is controlled through an amplifier so that the microphone arranged at the position where the sound is required to be reduced receives the minimum input, sound which is necessary for an occupant such as conversation in the vehicle, emergency sound of an emergency vehicle, horn sound, and various alarming sound may be canceled in addition to the warning sound. In contrast, according to the first embodiment, the microcomputer 11 controls the external speaker 14 to output the warning sound, and controls the internal speaker 15 to output the canceling sound based on the canceling sound source data to be synchronized with the warning sound by reading the canceling sound source data from the memory 11b. Therefore, an occupant of the vehicle can hear the sound which is necessary for the occupant.

The microcomputer 11 can control at least one of the phase difference and the sound pressure difference between the warning sound output from the external sound emitting unit and the canceling sound output from the internal sound emitting unit according to an operation of the operation part 16.

Since attenuation of a high frequency component is large in the warning sound transmitted from the external speaker 14 to the vehicle interior, as described above, it is possible to fully cancel the warning sound transmitted to the vehicle interior even if the high frequency component of the second sound source B is removed. Moreover, since it becomes unnecessary to output the high frequency component of the canceling sound, the effect of reducing power consumption is also acquired.

Since attenuation is large in the warning sound transmitted from the external speaker 14 to the vehicle interior, as described above, it is possible to fully cancel the warning sound even if the sound pressure of the canceling sound output from the internal speaker 15 is smaller than the warning sound output from the external speaker 14. Moreover, since the sound pressure of the canceling sound output from the internal speaker 15 can be made small, power consumption can also be reduced.

Since the first sound source A and the second sound source B are memorized in the one memory 11b, the cost can be reduced, compared with a case where the second sound source B and the first sound source A are separately memorized in the different memories.

Second Embodiment

Figure 4:
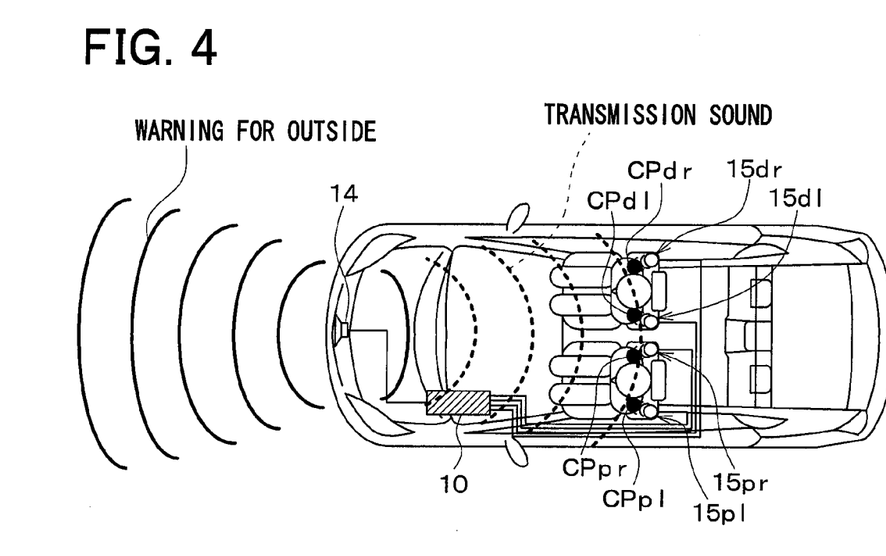
FIG. 4 is a view showing a vehicle including a vehicle approach alert device according to a second embodiment.

The vehicle approach alert device according to a second embodiment is explained with reference to FIG. 4-FIG. 6. A vehicle including the vehicle approach alert device of this embodiment is shown in FIG. 4. In the vehicle approach alert device of the first embodiment, the canceling point CP is set at the head of the occupant on the driver seat, and the canceling sound which cancels the warning sound is output from the one internal speaker 15.

In the vehicle approach alert device of the second embodiment, canceling points CPdr, CPdl are set for the driver seat of the vehicle, and canceling points CPpr, CPpl are set for a passenger seat of the vehicle. Further, internal speakers 15dr, 15dl are disposed in the driver seat as the internal sound emitting unit, and the canceling sound is output from each of the internal speakers 15dr, 15dl so that the warning sound is cancelled at the respective canceling points CPdr, CPdl. Internal speakers 15pr, 15pl are disposed in the passenger seat as the internal sound emitting unit, and the canceling sound is output from each of the internal speakers 15pr, 15pl so that the warning sound is cancelled at the respective canceling points CPpr, CPpl.

In the second embodiment, compared with the first embodiment, the second sound sources C-E are memorized by the memory 11b in addition to the second sound source B, the four internal speakers 15dr, 15dl, 15pr, 15pl are arranged for the driver seat and the passenger seat as the internal speaker 15, four amplifiers 13b, 13c, 13d, 13e are arranged as the amplifier 13, and the seat sensor 17 is prepared for each of the driver seat and the passenger seat.

The second sound sources B-E are sound sources for outputting the canceling sound with a phase opposite to that of the warning sound, and are memorized by the memory 11b together with the first sound source A.

The second sound source B is a sound source for outputting the canceling sound which cancels the warning sound reaching the canceling point CPdr close to a right ear of the driver.

The second sound source C is a sound source for outputting the canceling sound which cancels the warning sound reaching the canceling point CPdl close to a left ear of the driver.

The second sound source D is a sound source for outputting the canceling sound which cancels the warning sound reaching the canceling point CPpr close to a right ear of the passenger.

The second sound source E is a sound source for outputting the canceling sound which cancels the warning sound reaching the canceling point CPpl close to a left ear of the passenger.

Similarly to the second sound source B of the first embodiment, the second sound sources B-E are made by performing the filter processing with the reverse transfer characteristic between the internal speaker 15 and the microphone.

Figure 5:
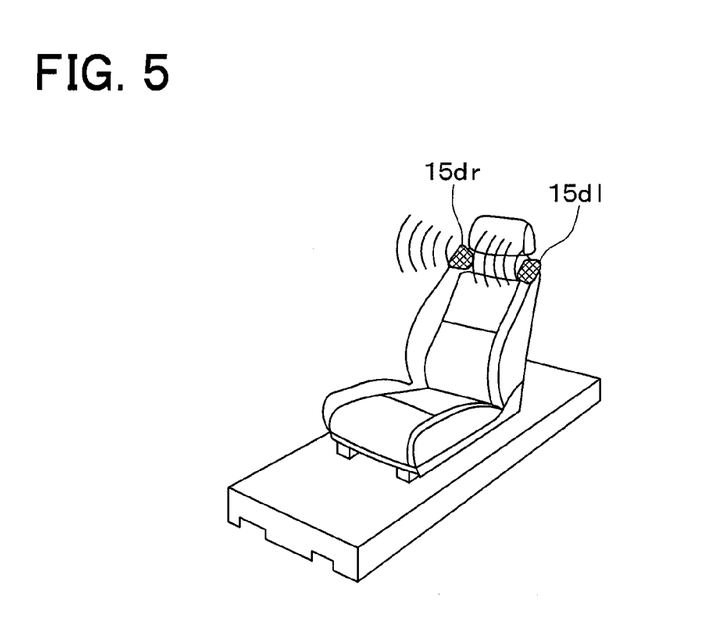
FIG. 5 is a perspective view showing a position of an internal speaker arranged to a driver seat.
Figure 6:
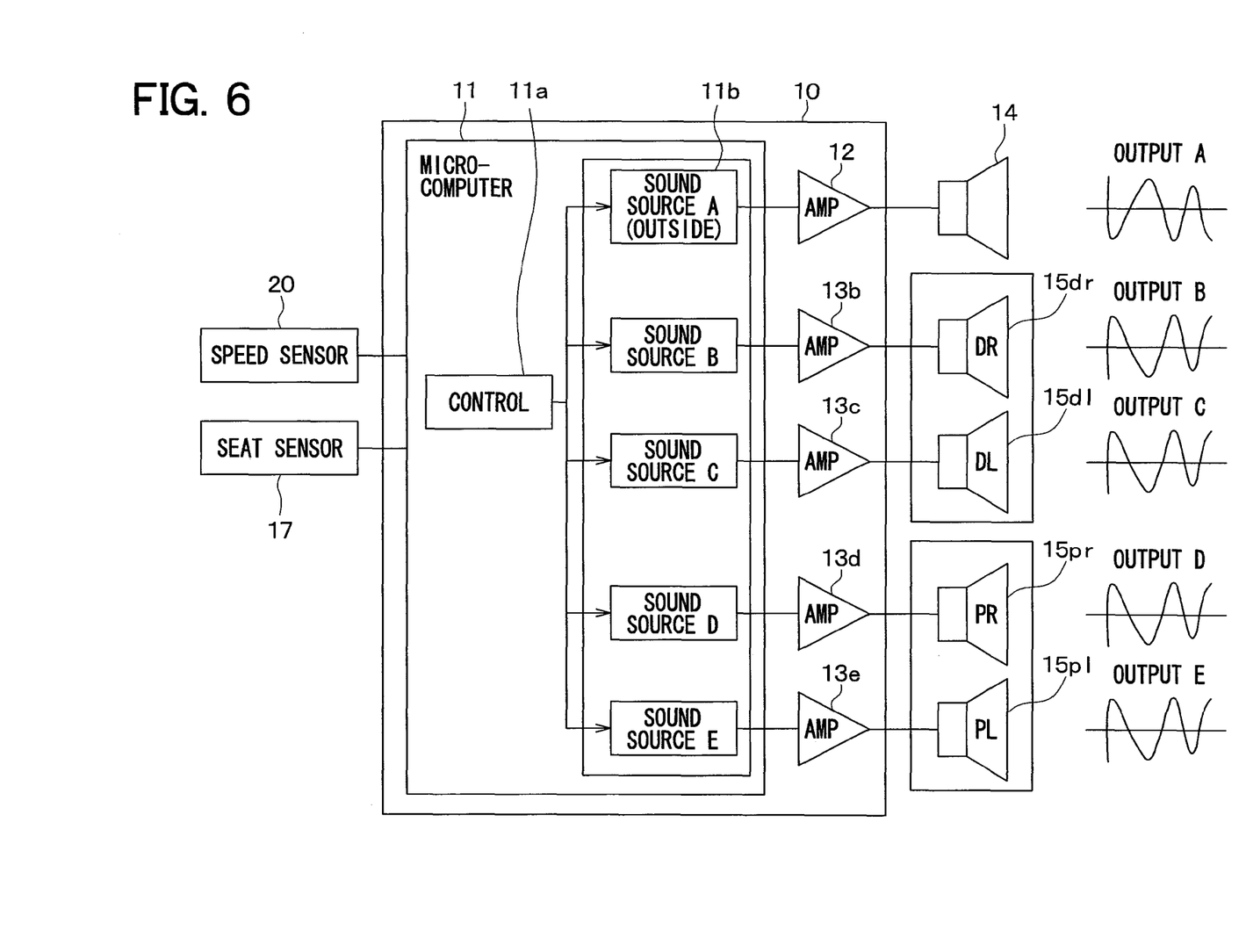
FIG. 6 is a block diagram of the vehicle approach alert device of the second embodiment.

FIG. 5 illustrates the internal speaker 15dr, 15dl on a seat back on which a driver is to be seated. Each of the internal speakers 15dr, 15dl is located in the upper part of the seat back. The internal speaker 15dr is located on the right side of the seat back and the internal speaker 15dl is located on the left side of the seat back when the driver is seated to face in the vehicle travelling direction.

That is, the internal speaker 15dr is located on the right side of the seat back for the driver such that the canceling sound is generated at the canceling point CPdr close to the right ear of the driver. The internal speaker 15dl is located on the left side of the seat back for the driver such that the canceling sound is generated at the canceling point CPdl close to the left ear of the driver.

Each of the internal speakers 15pr, 15pl is located in the upper part of the seat back on which the passenger is seated. The internal speaker 15dr is located on the right side of the seat back for the passenger, and the internal speaker 15dl is located on the left side of the seat back when the passenger is seated to face in the vehicle travelling direction.

That is, the internal speaker 15pr is arranged on the right side of the seat back for the passenger such that the canceling sound is generated at the canceling point CPpr close to the right ear of the passenger. The internal speaker 15pl is arranged on the left side of the seat back for the passenger seat such that the canceling sound is generated at the canceling point CPpl close to the left ear of the passenger.

The amplifier 13b amplifies the signal for emitting the canceling sound from the internal speaker 15dr, and outputs the amplified signal to the internal speaker 15dr. Moreover, the amplifier 13c amplifies the signal for emitting the canceling sound from the internal speaker 15dl, and outputs the amplified signal to the internal speaker 15dl.

The amplifier 13d amplifies the signal for emitting the canceling sound from the internal speaker 15pr, and outputs the amplified signal to the internal speaker 15pr. Moreover, the amplifier 13e amplifies the signal for emitting the canceling sound from the internal speaker 15pl, and outputs the amplified signal to the internal speaker 15pl.

The seat sensor 17 has a driver seat sensor and a passenger seat sensor. The driver seat sensor detects an occupant on the driver seat, and outputs a signal indicating the presence of occupant on the driver seat. The passenger seat sensor detects an occupant on the passenger seat, and outputs a signal indicating the presence of occupant on the passenger seat.

Figure 7:
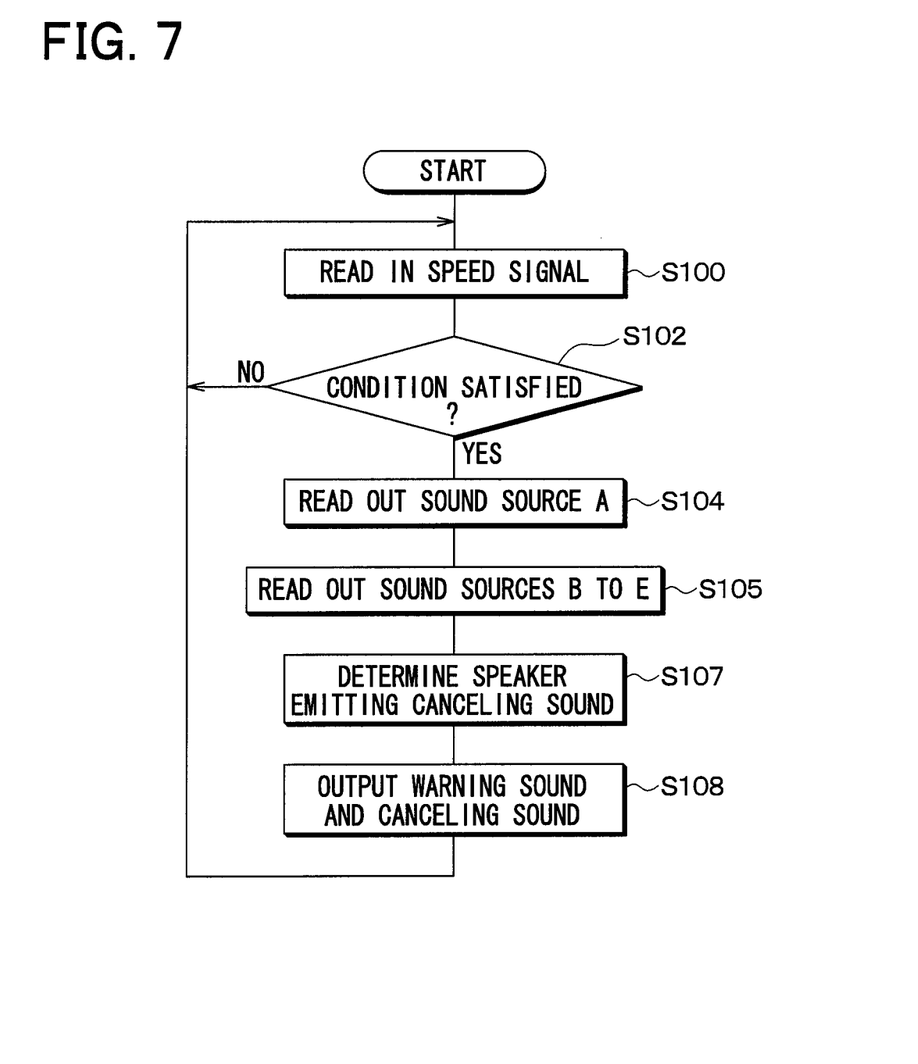
FIG. 7 is a flow chart executed by a microcomputer of the vehicle approach alert device of the second embodiment.

A flow chart executed by the microcomputer 11 of the vehicle approach alert device of this embodiment is explained with reference to FIG. 7. Since S100, S102, and S104 are the same as the flow chart shown in FIG. 3, the explanation is omitted.

After the second sound sources B-E for outputting the cancelling sounds inside the vehicle are read in S105, the speaker which outputs the canceling sound is specified (S107). Specifically, the presence of occupant on the driver seat and the presence of occupant on the passenger seat are determined based on the signals inputted from the seat sensor 17. The internal speaker on the seat on which it is determined that the occupant is seated is specified as the speaker for emitting the canceling sound.

For example, when it is determined that an occupant is seated on the driver seat and no occupant is seated on the passenger seat based on the signals inputted from the seat sensor 17, the internal speakers 15dr, 15dl in the driver seat are specified as the speaker for emitting the canceling sound. That is, the internal speaker 15pr, 15pl in the passenger seat are specified as not a speaker for emitting the canceling sound.

Moreover, when it is determined that an occupant is seated on the passenger seat and no occupant is seated on the driver seat based on the signals inputted from the seat sensor 17, the internal speakers 15pr, 15pl in the passenger seat are specified as the speaker for emitting the canceling sound. That is, the internal speaker 15dr, 15dl in the driver seat are specified as not a speaker for emitting the canceling sound.

Moreover, when it is determined that an occupant is seated on the driver seat and an occupant is seated on the passenger seat based on the signals inputted from the seat sensor 17, the internal speakers 15dr, 15dl in the driver seat and the internal speakers 15pr, 15pl in the passenger seat are specified as the speaker for emitting the canceling sound.

In S108, the warning sound is output from the external speaker 14 and the canceling sound is output from the internal speaker specified as the speaker for emitting the canceling sound in S107. Specifically, an audio signal based on the first sound source A is output to the amplifier 12, and an audio signal based on the second sound source is output to the amplifier connected to the internal speaker specified as the speaker for emitting the canceling sound to synchronize with the audio signal based on the first sound source A. Thus, the canceling sound is output from the corresponding internal speaker for emitting the canceling sound specified in S107.

According to the second embodiment, the similar advantages can be acquired as the first embodiment.

According to the second embodiment, the internal speaker 15dr, 15dl, 15pr, 15pl is defined on the seat back on which an occupant is seated. Thus, the internal speaker 15 is arranged to the seat back located near the occupant's ear. It is possible to use a small inexpensive speaker to emit the canceling sound with the minimum sound pressure, such that the warning sound is cancelled.

Moreover, the seat sensor 17 detects a presence of occupant on seats in the vehicle. Since the microcomputer 11 stops the canceling sound from the internal speaker 15*dr*, 15*dl*, 15*pr*, 15*pl* for the seat on which it is determined that no occupant is seated by the seat sensor 17, consuming useless electric power can be avoided.

Third Embodiment

Figure 8:
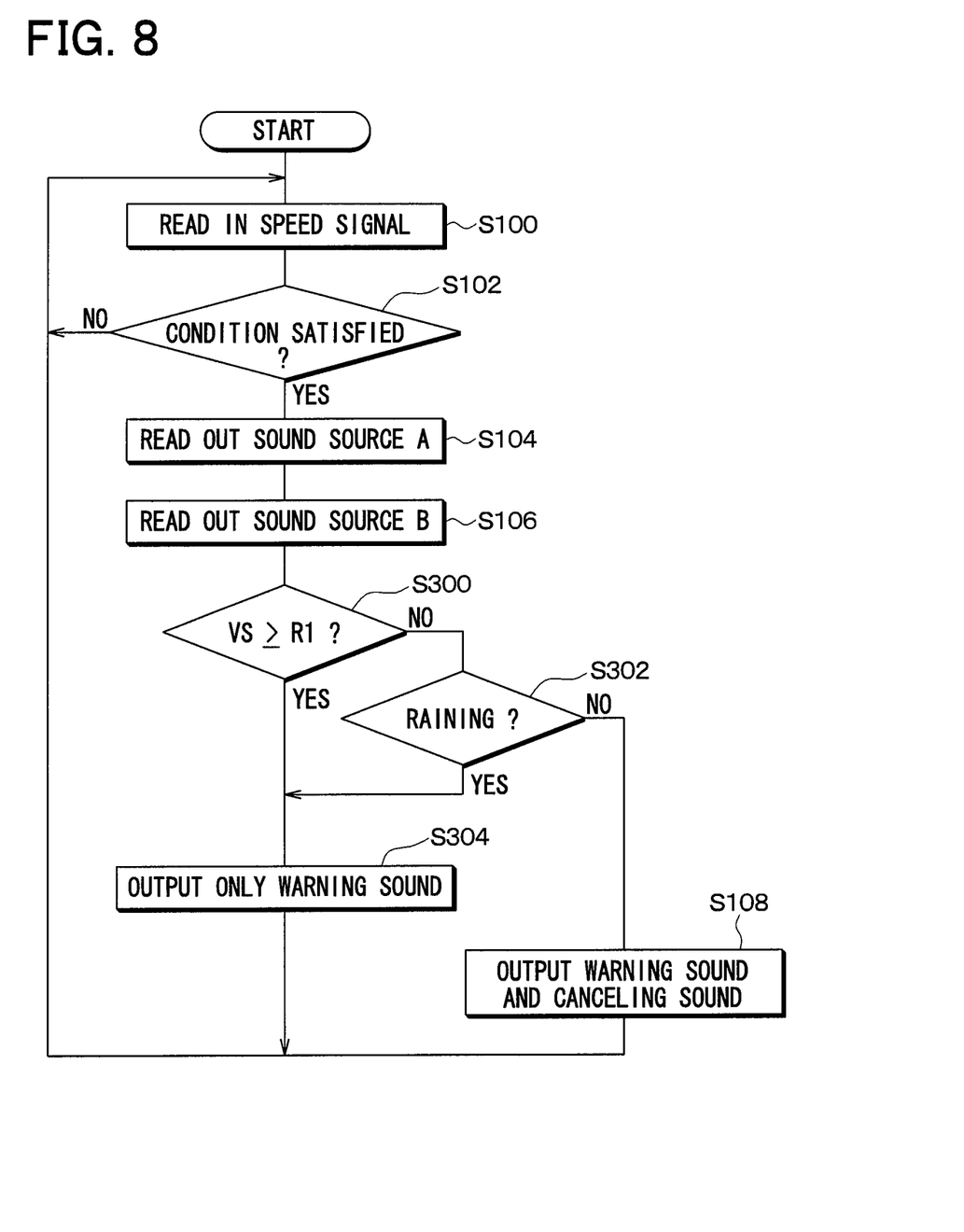
FIG. 8 is a flow chart executed by a microcomputer of a vehicle approach alert device according to a third embodiment.

The vehicle approach alert device according to a third embodiment is explained with reference to FIG. 8. The vehicle approach alert device of this embodiment further includes a raindrop sensor (not shown) compared with the first embodiment.

The raindrop sensor detects a raindrop outside of the vehicle. The microcomputer 11 determines whether it is raining outside the vehicle based on the signal inputted from the raindrop sensor.

A flow chart executed by the microcomputer 11 of the vehicle approach alert device of this embodiment is explained with reference to FIG. 8. Since S100, S102, S104 and S106 are the same as the flow chart shown in FIG. 3, the explanation is omitted.

After the second sound source B for outputting the cancelling sound is read in S106, it is determined whether a speed VS of the vehicle is higher than or equal to a predetermined value R1 such as 20 km/h in S300.

When the speed VS of the vehicle is less than the predetermined value R1 (No in S300), it is determined whether it is raining outside the vehicle based on the signal inputted from the raindrop sensor (S302).

When it is not raining outside the vehicle (No in S302), the warning sound and the canceling sound are output in S108. Specifically, the audio signal based on the first sound source A is output to the amplifier 12, and the audio signal based on the second sound source B is output to the amplifier 13 to synchronize with the audio signal based on the first sound source A. Thus, the canceling sound based on the second sound source B is reproduced to synchronize with the warning sound based on the first sound source A, and it returns to S100.

When the speed VS of the vehicle is higher than or equal to the predetermined value while the warning sound and the canceling sound are output (Yes in S300), the warning sound is output and the canceling sound is not output in S304. In other words, only the warning sound is output. Specifically, the audio signal based on the first sound source A is output to the amplifier 12, and the output of the audio signal based on the second sound source B to the amplifier 13 is suspended. Therefore, the canceling sound is not output from the internal speaker 15 although the warning sound is output from the external speaker 14.

When a raindrop is detected by the raindrop sensor (Yes in S302) while the warning sound and the canceling sound are output, the warning sound is output and the canceling sound is not output in S304. Specifically, the audio signal based on the first sound source A is output to the amplifier 12, and the output of the audio signal based on the second sound source B to the amplifier 13 is suspended. Therefore, the canceling sound is not output from the internal speaker 15 although the warning sound is output from the external speaker 14.

According to the third embodiment, the same effect can be acquired as the first embodiment.

Moreover, when it is determined that the speed of the vehicle is beyond the predetermined value, the microcomputer 11 stops the canceling sound.

When the speed of the vehicle is beyond the predetermined value, the travelling sound of the vehicle becomes large, and a big effect cannot be acquired even if the canceling sound is output from the internal sound emitting unit. For this reason, as described above, when the speed determining part determines that the speed of the vehicle is beyond the predetermined value, consuming useless electric power can be avoided by stopping the canceling sound.

When it is determined that it is raining outside the vehicle, the microcomputer 11 stops the output of the canceling sound.

In case where it is raining outside the vehicle, even if the canceling sound is output from the internal sound emitting unit, the effect may be reduced by the raining sound. For this reason, as described above, when it is determined that it is raining outside the vehicle, consuming useless electric power can be avoided by stopping the canceling sound.

Other Embodiment

In each embodiment, the external speaker 14 is installed in the engine compartment of the vehicle. Alternatively, the external speaker 14 may be placed at a position other than the inside of the engine compartment.

The vehicle approach alert device is not limited to be used for the hybrid vehicle which runs using the engine and the motor. For example, the vehicle approach alert device may be applied to a vehicle other than the hybrid vehicle such as an electric vehicle equipped only with an electric motor, or a fuel-cell vehicle which runs with the electric power generated using the fuel cell.

In the second embodiment, the canceling sound is generated using the internal speakers 15*dr*, 15*dl*, 15*pr*, 15*pl* in the seat backs of the driver seat and the passenger seat. Furthermore, the internal speaker may be arranged in the seat back or the headrest of the rear seat to generate the canceling sound.

In the second embodiment, the internal speakers 15*dr*, 15*dl*, 15*pr*, 15*pl* are positioned in the upper part of the seat back. Alternatively, the internal speakers 15*dr*, 15*dl*, 15*pr*, 15*pl* may be arranged in the headrest defined on the seat back or the ceiling of the vehicle.

The first sound source A and the second sound source B may be constituted as sound source data other than the PCM sound source data.

In the first embodiment, the operation part 16 has the phase difference adjustment switch which adjusts the phase difference between the warning sound output from the external speaker 14 and the canceling sound output from the internal speaker 15, and the sound pressure difference adjustment switch which adjusts the sound pressure difference between the warning sound output from the external speaker 14 and the canceling sound output from the internal speaker 15. The operation part 16 may include only one of the phase difference adjustment switch and the sound pressure difference adjustment switch.

In the third embodiment, when it is determined that the speed of the vehicle is beyond the predetermined value, the output of the canceling sound is stopped. Further, when it is determined that it is raining outside the vehicle, the output of the canceling sound is stopped. For example, the output of the canceling sound may be stopped when it is determined that disturbance noise sound other than the warning sound is beyond a predetermined value. Thus, useless canceling sound is restricted from being emitted when the disturbance noise sound is beyond the predetermined value.

In the third embodiment, the vehicle approach alert device may further include an inverter noise determining part which determines whether the inverter noise which drives the motor for run is beyond a predetermined value based on the number of rotations of the motor. The microcomputer 11 may stop the output of the canceling sound when it is determined that the inverter noise is beyond the predetermined value by the inverter noise determining part.

In the first embodiment, the internal speaker 15 may be replaced with a connector terminal 151 (see FIG. 2) connected to an acoustic sound emitting unit 150 prepared in the interior of the vehicle to emit music or radio broadcasting through an amplifier 152 disposed in an audio ECU 153. The microcomputer 11 may output the signal for outputting the canceling sound to the connector terminal 151. Thereby, the cost can be reduced by eliminating the internal speaker 15 for exclusive use, and the canceling sound can be emitted from the acoustic sound emitting unit 150.

The orientation of the face of the occupant on the driver seat may be detected using a camera. The output characteristic of the canceling sound outputted from the internal speaker 15 may be changed according to the orientation of the face of the occupant. In this case, the memory 11b is made to memorize plural second sound sources B, and the transfer characteristics of the canceling sound is changed according to the orientation of the face of the occupant on the driver seat. The second sound source B corresponding to the orientation of the face of the occupant on the driver seat can be read from the memory 11b to output the canceling sound from the internal speaker 15.

The position of the ear of the occupant on the driver seat may be detected using a camera. The output characteristic of the canceling sound outputted from the internal speaker 15 may be changed according to the position of the ear of the occupant. In this case, the memory 11b is made to memorize plural second sound sources B, and the transfer characteristics of the canceling sound is changed according to the position of the ear of the occupant on the driver seat. The second sound source B corresponding to the position of the ear of the occupant on the driver seat can be read from the memory 11b to output the canceling sound from the internal speaker 15.

The vehicle approach alert device may include a person detecting element which detects whether a pedestrian or a person riding on a bicycle exists in the proximity of the vehicle. When it is detected that a person exists adjacent to the vehicle, the microcomputer 11 stops the canceling sound. Thereby, the occupant can recognize that the warning sound is normally output.

In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

S300 may correspond to a speed determining part, and S302 may correspond to a rain determining part.

Such changes and modifications are to be understood as being within the scope of the present disclosure as defined by the appended claims.

What is claimed is:

1. A vehicle approach alert device that warns an approach of a vehicle by emitting a warning sound from an external sound emitter toward an outside of the vehicle, the vehicle approach alert device comprising:
   an internal sound emitter configured to emit sound toward an inside of the vehicle;
   a memory memorizing a warning sound source data for emitting the warning sound and a canceling sound source data for emitting a canceling sound that cancels the warning sound transmitted from the external sound emitter to an inside of the vehicle; and
   a controller configured to
      read the warning sound source data from the memory,
      read the canceling sound source data from the memory,
      output an audio signal based on the warning sound source data read from the memory to cause the external sound emitter to emit the warning sound, and
      output an audio signal based on the canceling sound source data read from the memory to cause the internal sound emitter to emit the canceling sound, wherein
      the audio signal based on the warning sound source data read from the memory and the audio signal based on the canceling sound source data read from the memory synchronize with each other.

2. The vehicle approach alert device according to claim 1, further comprising:
   an operator that controls at least one of a phase difference and a sound pressure difference between the warning sound emitted from the external sound emitter and the canceling sound emitted from the internal sound emitter, wherein
   the controller controls at least one of the phase difference and the sound pressure difference between the warning sound emitted from the external sound emitter and the canceling sound emitted from the internal sound emitter according to an operation of the operator.

3. The vehicle approach alert device according to claim 1, wherein
   the canceling sound source data includes no high frequency component higher than or equal to 2 kHz.

4. The vehicle approach alert device according to claim 1, wherein
   the controller controls a sound pressure of the canceling sound emitted from the internal sound emitter to be smaller than that of the warning sound emitted from the external sound emitter.

5. The vehicle approach alert device according to claim 1, wherein
   the memory is a single memory that memorizes the canceling sound source data and the warning sound source data.

6. The vehicle approach alert device according to claim 1, further comprising:
   a connector terminal connected to an acoustic sound emitter disposed inside of the vehicle, wherein
   the controller outputs a signal for outputting the canceling sound to the connector terminal.

7. The vehicle approach alert device according to claim 1, wherein
the internal sound emitter is arranged in at least one of a seat back on which an occupant of the vehicle is seated and a headrest defined on the seat back.

8. The vehicle approach alert device according to claim 7, further comprising:
a seat sensor that detects an occupant on a seat of the vehicle, wherein
the controller stops the canceling sound from being emitted from the internal sound emitter defined in the seat on which the occupant is not detected by the seat sensor.

9. The vehicle approach alert device according to claim 1, further comprising:
a speed determiner configured to determine whether a speed of the vehicle is higher than or equal to a predetermined value, wherein
the controller stops the canceling sound from being emitted from the internal sound emitter when the speed determiner determines that the speed of the vehicle is higher than or equal to the predetermined value.

10. The vehicle approach alert device according to claim 1, further comprising:
a rain determiner configured to determine whether it is raining outside the vehicle, wherein
the controller stops the canceling sound from being emitted from the internal sound emitter when the rain determiner determines that it is raining outside the vehicle.

11. The vehicle approach alert device according to claim 1, wherein
each of the warning sound source data and the canceling sound source data is a pulse code modulation sound source data in which a signal of frequency component is sampled and quantized, and a magnitude of the signal is digitalized as data, and
the warning sound source data and the canceling sound source data have a same time length as the pulse code modulation sound source data.

12. The vehicle approach alert device according to claim 2, wherein
the operator is operable by an operator, and
the controller controls at least one of the phase difference and the sound pressure difference between the warning sound output from the external sound emitter and the canceling sound output from the internal sound emitter according to a signal in response to an operation to the operator.

13. The vehicle approach alert device according to claim 2, wherein
the operator is operable by an occupant of the vehicle, and
the controller controls at least one of the phase difference and the sound pressure difference between the warning sound output from the external sound emitter and the canceling sound output from the internal sound emitter according to a signal in response to an operation to the operator.

14. The vehicle approach alert device according to claim 1, wherein
the audio signal based on the warning sound source data read from the memory has a phase opposite from that of the audio signal based on the canceling sound source data read from the memory.

15. The vehicle approach alert device according to claim 1, wherein
the controller repeats outputting the audio signal based on the warning sound source data read from the memory and the audio signal based on the canceling sound source data read from the memory to be synchronized with each other without performing real-time calculation in which a signal for canceling the warning sound is generated each time based on an input from a microphone.

16. The vehicle approach alert device according to claim 1, wherein
the external sound emitter is an external speaker and the internal sound emitter is an internal speaker.

17. The vehicle approach alert device according to claim 7, wherein
the internal sound emitter is located near an ear of the occupant.

* * * * *